(12) United States Patent
Kramer et al.

(10) Patent No.: US 8,608,899 B2
(45) Date of Patent: Dec. 17, 2013

(54) HEAT-CURING EPOXY RESIN COMPOSITION COMPRISING AN ACCELERATOR HAVING HETEROATOMS

(75) Inventors: Andreas Kramer, Zurich (CH); Karsten Frick, Remetschwil (CH)

(73) Assignee: Sika Technology AG, Baar (CH)

( * ) Notice: Subject to any disclaimer, the term of this patent is extended or adjusted under 35 U.S.C. 154(b) by 279 days.

(21) Appl. No.: 12/993,593

(22) PCT Filed: May 28, 2009

(86) PCT No.: PCT/EP2009/056491
§ 371 (c)(1),
(2), (4) Date: Nov. 19, 2010

(87) PCT Pub. No.: WO2009/150059
PCT Pub. Date: Dec. 17, 2009

(65) Prior Publication Data
US 2011/0067813 A1 Mar. 24, 2011

(30) Foreign Application Priority Data
May 28, 2008 (EP) .................... 08157041

(51) Int. Cl.
*C09J 163/00* (2006.01)
*C08F 8/00* (2006.01)
*C08L 63/00* (2006.01)
*C08L 75/00* (2006.01)
*C08F 283/00* (2006.01)
*C08F 283/10* (2006.01)
*C08G 59/14* (2006.01)
*C08G 59/16* (2006.01)

(52) U.S. Cl.
USPC ............ 156/330; 525/113; 525/528; 525/533

(58) Field of Classification Search
USPC ............................ 156/330; 525/113, 528, 533
See application file for complete search history.

(56) References Cited

U.S. PATENT DOCUMENTS

| | | | |
|---|---|---|---|
| 3,956,237 A | 5/1976 | Doorakian et al. | |
| 4,507,445 A * | 3/1985 | Andrews | 525/504 |
| 4,562,241 A | 12/1985 | Renner | |
| 5,707,439 A | 1/1998 | Takekoshi et al. | |
| 6,197,849 B1 | 3/2001 | Zilg et al. | |
| 6,322,890 B1 | 11/2001 | Barron et al. | |
| 2007/0027274 A1 | 2/2007 | Antelmann et al. | |
| 2008/0076886 A1 | 3/2008 | Burns et al. | |
| 2009/0264558 A1* | 10/2009 | Kramer et al. | 523/400 |

FOREIGN PATENT DOCUMENTS

| | | | |
|---|---|---|---|
| DE | 2 123 033 | 8/1972 | |
| EP | 0 308 664 A1 | 3/1989 | |
| EP | 0 338 985 A1 | 10/1989 | |
| EP | 0 353 190 A1 | 1/1990 | |
| EP | 0 603 131 A1 | 6/1994 | |
| EP | 1 152 019 A1 | 11/2001 | |
| EP | 1 728 825 A1 | 12/2006 | |
| EP | 1 916 269 A 1 | 4/2008 | |
| EP | 1916269 A1 * | 4/2008 | ............. C08G 18/10 |
| WO | WO 00/20483 A1 | 4/2000 | |
| WO | WO 01/94492 A1 | 12/2001 | |
| WO | WO 03/078163 A1 | 9/2003 | |
| WO | WO 2004/055092 A1 | 7/2004 | |
| WO | WO 2004/106402 A2 | 12/2004 | |
| WO | WO 2005/007720 A1 | 1/2005 | |
| WO | WO 2005/007766 A1 | 1/2005 | |
| WO | WO 2005/097893 A1 | 10/2005 | |
| WO | WO 2006/052725 A1 | 5/2006 | |
| WO | WO 2006/052726 A1 | 5/2006 | |
| WO | WO 2006/052727 A1 | 5/2006 | |
| WO | WO 2006/052728 A1 | 5/2006 | |
| WO | WO 2006/052729 A1 | 5/2006 | |
| WO | WO 2006/052730 A1 | 5/2006 | |
| WO | WO 2007/020266 A1 | 2/2007 | |
| WO | WO 2007/025007 A1 | 3/2007 | |
| WO | WO 2008/016889 A1 | 2/2008 | |
| WO | WO 2008/038257 | 4/2008 | |
| WO | WO 2008/049857 A1 | 5/2008 | |
| WO | WO 2008/049858 A1 | 5/2008 | |
| WO | WO 2008/049859 A1 | 5/2008 | |
| WO | WO 2008/049860 A1 | 5/2008 | |

OTHER PUBLICATIONS

Hermel-Davidock, Theresa J. et al., "Control of the Block Copolymer Morpholgy in Templated Epoxy Thermosets," Journal of Polymer Science: Part B: Polymer Physics, vol. 45, pp. 33383348, 2007.
International Search Report issued Sep. 30, 2009 in PCT/EP2009/056491 (with English translation).
Feb. 23, 2012 Office Action issued in Chinese Patent Application No. 200980117892.0 (with translation).

* cited by examiner

*Primary Examiner* — Michael Orlando
(74) *Attorney, Agent, or Firm* — Oliff & Berridge, PLC

(57) ABSTRACT

A heat-curing epoxy resin composition that includes an epoxy resin, a curing agent, an accelerator, and an optional toughener. The epoxy resin compositions are suitable in particular for use as bodyshell adhesives and for preparation of structural foams. An accelerator of formula (I) results in increased impact strength the of heat-curing epoxy resin compositions.

20 Claims, No Drawings

HEAT-CURING EPOXY RESIN COMPOSITION COMPRISING AN ACCELERATOR HAVING HETEROATOMS

BACKGROUND

Technical Field

The invention relates to the field of impact-resistant heat-curing epoxy resin compositions, in particular for use as bodyshell adhesives and for preparation of structural foams.

SUMMARY

State of the Art

Heat-curing epoxy resin compositions have been known for a long time in the prior art. For some time, efforts have been made to eliminate or at least considerably reduce the major disadvantage of epoxy resin compositions, namely their brittleness, which means that on impact loading the cured epoxy resin composition cracks or is destroyed. This has already been tried by adding strength modifiers or by chemical modification of epoxy resins.

An important application of heat-curing epoxy resin compositions is in vehicle assembly, in particular in bonding or in filling cavities in the bodyshell with foam material. In both cases, after application of the epoxy resin composition, the body is heated in a CDC (cathodic dip coating) oven, whereby the heat-curing epoxy resin composition is also cured and optionally expanded into a foam.

For fast curing, usually accelerators are used in addition to heat-activated curing agents for epoxy resins. Ureas are an important category of accelerators. Impact-resistant heat-curing epoxy resin compositions, which can have ureas as accelerators, are known in the prior art, for example, from WO2004/106402 A2 and WO2004/055092 A1.

However, currently efforts are being made on the market to considerably lower the cure temperature. Thus there is a great need on the market for heat-curing epoxy resin compositions which also cure at lower temperature, i.e., at a temperature below 180° C., within a short time period, typically within 10 to 15 minutes.

Thus aromatic ureas are used, which because of their structure are quite reactive. But it has been shown that using such aromatic accelerators leads to major problems in storage stability of the heat-curing epoxy resin compositions.

DESCRIPTION OF THE INVENTION

The aim of the present invention is to provide impact-resistant, heat-curing epoxy resin compositions which on the one hand have good storage stability at room temperature and on the other hand have a lower required cure temperature.

Surprisingly, this aim could be achieved by means of a heat-curing epoxy resin composition as specified in claim 1. This epoxy resin composition can be used especially well as a one-component heat-curing adhesive, in particular as a heat-curing one-component bodyshell adhesive in vehicle assembly, as well as for preparation of coatings, in particular lacquers, as well as for preparation of structural foam for reinforcement of cavities, in particular in metallic structures.

It was quite surprisingly also discovered that using an accelerator of formula (I) results in increased impact strength of heat-curing epoxy resin compositions. This is also the case for heat-curing epoxy resin compositions which already exhibit considerable impact strength (for example, measured as impact strength according to ISO 11343).

Further aspects of the invention are the subject matter of other independent claims. Especially preferred embodiments of the invention are the subject matter of the dependent claims.

DETAILED DESCRIPTION OF EMBODIMENTS

Embodiments of the Invention

In a first aspect, the present invention relates to a heat-curing epoxy resin composition which includes a) at least one epoxy resin A with more than one epoxy group per molecule on the average;

b) at least one curing agent B for epoxy resins which is activated by elevated temperature; and c) at least one accelerator C of formula (I)

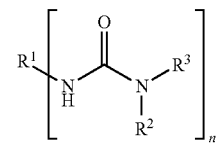

as well as d) optionally at least one toughener D.

In formula (I), $R^1$ stands for an n-valent aliphatic, cycloaliphatic, or araliphatic radical with at least one hetero atom. This hetero atom is not a hetero atom of a urea, biuret, isocyanurate, urethane, uretdione, or diuretdione group.

The absence of biuret, isocyanurate, urethane, uretdione, or diuretdione groups in radical $R^1$ results in better thermal stability of accelerator C. It has actually been shown that, in accelerators which (not according to the invention) have such groups in the radical $R^1$, volatile and undesirable cleavage products form on heating, such as, for example, diisocyanates. This is not the case (or at least occurs to a lesser extent) for accelerators C of formula (I).

The at least one hetero atom present in radical $R^1$ is preferably an oxygen atom, in particular in the form of a hydroxyl or ether group.

Furthermore, $R^2$ and $R^3$ either each independently stand for an alkyl group or an aralkyl group, which is optionally substituted or has a hetero atom, or else $R^2$ and $R^3$ together stand for a divalent aliphatic radical with 3 to 20 C atoms that is part of an optionally substituted heterocyclic ring with 5 to 8 ring atoms, preferably 6 ring atoms.

Furthermore, n stands for a number from 1 to 10, in particular for 1 to 3, preferably for 1 or 2.

In this document, the use of the term "each independently" in connection with substituents, radicals, or groups means that substituents, radicals, or groups having the same designation can appear at the same time in the same molecule with different meanings.

Here in this entire text, the prefix "poly" in "polyisocyanate," "polyamine," "polyol," "polyphenol", and "polymercaptan" indicates molecules that formally contain two or more of the respective functional groups.

"Toughener" in this document means an additive to an epoxy resin matrix that, even for small additions of 0.1-50 wt. %, in particular 0.5-40 wt. %, causes a definite increase in toughness, and thus higher bending, tensile, shock, or impact stresses can be withstood before the matrix cracks or fractures.

"Amphiphilic block copolymer" in this document means a copolymer which contains at least one block segment miscible with epoxy resin and at least one block segment immiscible with epoxy resin. In particular, amphiphilic block copolymers are such compounds as are disclosed in WO 2006/052725 A1, WO 2006/052726 A1, WO 2006/052727 A1, WO 2006/052728 A1, WO 2006/052729 A1, WO 2006/052730 A1, and WO 2005/097893 A1, the contents of which are incorporated herein by reference.

The radical $R^2$ and/or $R^3$ preferably stands for an alkyl group with 1 to 10 C atoms, in particular 1 to 4 C atoms, preferably for a methyl group.

The epoxy resin A with more than one epoxy group per molecule on the average is preferably a liquid epoxy resin or a solid epoxy resin. The term "solid epoxy resin" is very familiar to the person skilled in the art of epoxides, and is used in contrast to "liquid epoxy resins." The glass transition temperature of solid resins is above room temperature, i.e., at room temperature they can be broken up into free-flowing particles.

Preferred epoxy resins have formula (II):

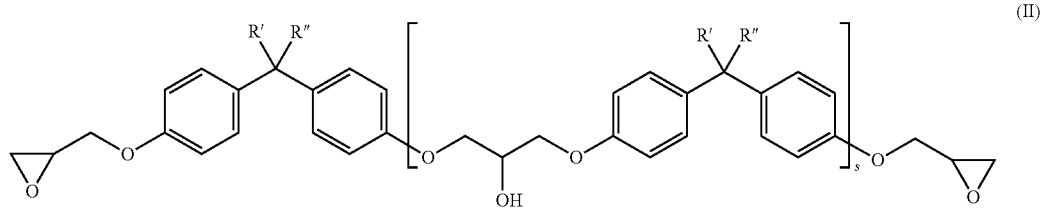

Here the substituents R' and R" each independently stand for either H or $CH_3$.

For solid epoxy resins, the subscript s stands for a number>1.5, in particular from 2 to 12.

Such solid epoxy resins are commercially available, for example, from Dow or Huntsman or Hexion.

Compounds of formula (II) with a subscript s from 1 to 1.5 are called semisolid epoxy resins by the person skilled in the art. For the present invention here, they are also considered as solid resins. However, epoxy resins in the narrower sense are preferred as the solid epoxy resins, i.e., where the subscript s has a value>1.5.

For liquid epoxy resins, the subscript s stands for a number less than 1. The subscript s preferably stands for a number less than 0.2.

These compounds are therefore preferably diglycidyl ethers of bisphenol A (DGEBA), bisphenol F, and bisphenol A/F. Such liquid resins are available, for example, as Araldite® GY 250, Araldite® PY 304, Araldite® GY 282 (Huntsman), or D.E.R.™ 331, or D.E.R.™ 330 (Dow), or Epikote 828 (Hexion).

Furthermore, "novolacs" are suitable as epoxy resin A. These have in particular the following formula:

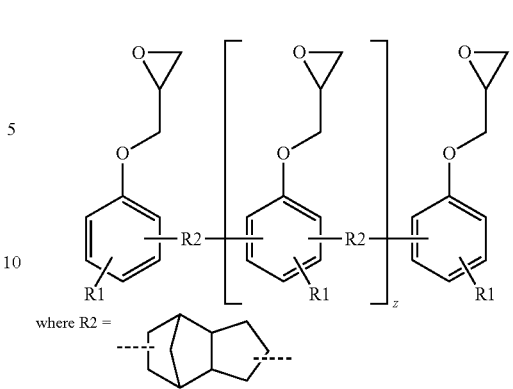

where R2 =

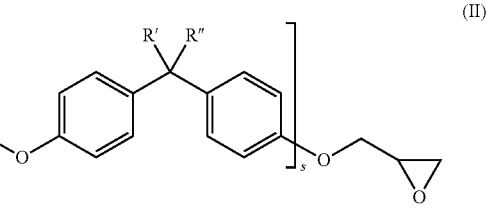

or $CH_2$, R1=H or methyl and z=0 to 7.

Here these can be in particular phenol or cresol novolacs ($R2=CH_2$).

Such epoxy resins are commercially available under the trade names EPN or ECN as well as Tactix® from Huntsman or as the D.E.N.™ product line from Dow Chemical.

Epoxy resin A preferably is a liquid epoxy resin of formula (II). In another even more preferred embodiment, the heat-curing epoxy resin composition contains at least one liquid epoxy resin of formula (II) with s<1 as well as at least one solid epoxy resin of formula (II) with s>1.5.

The proportion of epoxy resin A is preferably 10-85 wt. %, in particular 15-70 wt. %, preferably 15-60 wt. %, based on the weight of the composition.

The composition according to the invention additionally contains at least one curing agent B for epoxy resins which is activated at elevated temperature. Here the curing agent is preferably selected from the group consisting of dicyanodiamide, guanamines, guanidines, aminoguanidines, and derivatives thereof. Compounds in the class of imidazoles and amine complexes can also be used.

Dicyanodiamide is particularly preferred as curing agent B.

The total proportion of curing agent B is advantageously 1-10 wt. %, preferably 2-8 wt. %, based on the weight of the total composition.

The amount of curing agent B for epoxy resins which is activated by elevated temperature is especially preferably 0.1-30 wt. %, in particular 0.2-10 wt. %, based on the weight of epoxy resin A.

The composition according to the invention also contains at least one accelerator C of formula (I).

In an especially preferred embodiment, $R^1$ stands for an epoxide EP with n epoxy groups, in which at least one of the n epoxy groups of formula (IIa) has been replaced by groups of formula (IIb), where the C atom marked with the asterisk * is bonded to the nitrogen of the urea group in the accelerator of formula (I).

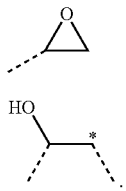

If not all of the n epoxy groups of formula (IIa) have been replaced by groups of formula (IIb), then accelerator C of formula (I) still has epoxy groups.

Epoxy group-containing reactive diluents as well as epoxy resins are suitable in particular as epoxides EP.

Suitable reactive diluents for epoxides EP are in particular:

Glycidyl ethers of monofunctional saturated or unsaturated, branched or unbranched, cyclic or open-chain $C_4$-$C_{30}$ alcohols, in particular selected from the group consisting of butyl glycidyl ether, hexyl glycidyl ether, 2-ethylhexyl glycidyl ether, allyl glycidyl ether, tetrahydrofurfuryl and furfuryl glycidyl ether, trimethoxysilyl glycidyl ether.

Glycidyl ethers of difunctional saturated or unsaturated, branched or unbranched, cyclic or open-chain $C_2$-$C_{30}$ alcohols, in particular selected from the group consisting of ethylene glycol glycidyl ether, butanediol glycidyl ether, hexanediol glycidyl ether, octanediol glycidyl ether, cyclohexane dimethanol diglycidyl ether, and neopentyl glycol diglycidyl ether.

Glycidyl ether of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, glycerol, or trimethylolpropane.

Glycidyl ethers of phenol compounds and aniline compounds, in particular selected from the group consisting of phenyl glycidyl ether, cresyl glycidyl ether, p-tert-butyl phenyl glycidyl ether, nonylphenyl glycidyl ether, 3-n-pentadecenyl glycidyl ether (from cashew nutshell oil), N,N-diglycidyl aniline, and p-aminophenyl triglycidyl[ether].

Epoxidized amines such as N,N-diglycidyl cyclohexylamine.

Epoxidized monocarboxylic acids or dicarboxylic acids, in particular selected from the group consisting of neodecanoic acid glycidyl ester, methacrylic acid glycidyl ester, benzoic acid glycidyl ester, phthalic acid diglycidyl ester, tetra- and hexahydrophthalic acid diglycidyl ester, and diglycidyl esters of dimeric fatty acids, as well as terephthalic acid glycidyl ester and trimellitic acid glycidyl ester.

Epoxidized difunctional or trifunctional, low molecular weight to high molecular weight polyether polyols, in particular polyethylene glycol diglycidyl ether or polypropylene glycol diglycidyl ether.

Hexanediol diglycidyl ether, cresyl glycidyl ether, p-tert-butylphenyl glycidyl ether, polypropylene glycol diglycidyl ether, and polyethylene glycol diglycidyl ether are especially preferred.

Suitable epoxy resins for epoxides EP are in particular those epoxy resins with more than one epoxy group per molecule on the average, such as already have been described above for epoxy resin A.

Therefore $R^1$ preferably stands for a radical of formula (III)

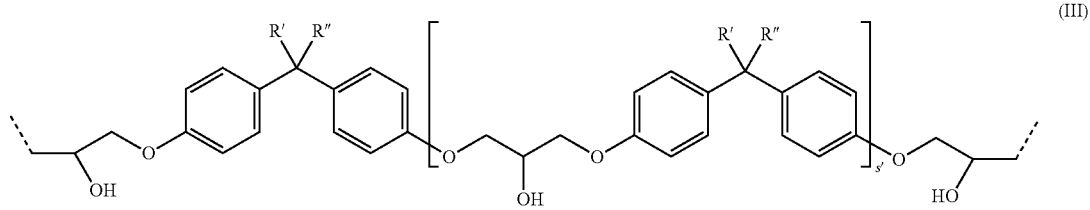

where R' and R" each independently stand either for H or $CH_3$ and the subscript s' stands for a number from 0 to 12.

In a further embodiment, $R^1$ stands for a radical of an ether group-containing aliphatic polyamine, in particular a polyoxyalkylene diamine or polyoxyalkylene triamine, after removal of the amino groups. Examples of ether group-containing aliphatic polyamines are firstly bis(2-aminoethyl) ether, 4,7-dioxadecane-1,10-diamine, 4,9-dioxadodecane-1,12-diamine and higher oligomers thereof, and secondly polyoxyalkylene diamines and polyoxyalkylene triamines.

Such polyoxyalkylene polyamines can be obtained, for example, under the name Jeffamine® (from Huntsman Chemicals), under the name polyetheramine (from BASF) or under the name PC Amine® (from Nitroil).

Such triamines are marketed, for example, as the Jeffamine® T line from Huntsman Chemicals, such as, for example, Jeffamine® T-3000, Jeffamine® T-5000, or Jeffamine® T-403.

Suitable polyoxyalkylene diamines are in particular those of formula (V).

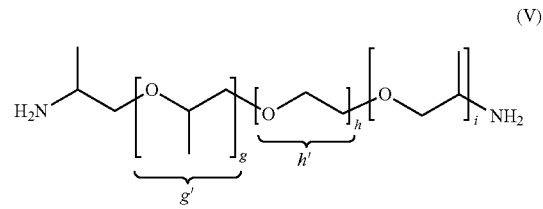

Here g' represents the structural element originating from propylene oxide, and h' represents the structural element originating from ethylene oxide. Furthermore, g, h, and i stand for numbers from 0 to 40, provided that the sum of g, h, and i≥1.

Particularly preferred are Jeffamine®, as are sold as the D line and the ED line by Huntsman Chemicals, such as, for example, Jeffamine® D-230, Jeffamine® D-400, Jeffamine® D-2000, Jeffamine® D-4000, Jeffamine® ED-600, Jeffamine® ED-900, Jeffamine® ED-2003, or Jeffamine® EDR-148.

Especially preferred as suitable ether group-containing aliphatic polyamines is the one that is sold as Jeffamine® D-230 by Huntsman Chemicals.

The molecular weight of these ether group-containing aliphatic polyamines is preferably between 200 and 5000 g/mol.

In a further embodiment, $R^1$ stands for a radical of an amino acid or an amino acid ester, preferably an amino acid ester, after removal of the amino group.

The amino acids can be natural or synthetically produced.

Suitable amino acids are in particular amino acids selected from the group consisting of alanine, arginine, asparagine, aspartic acid, glutamic acid, glutamine, glycine, histidine, isoleucine, leucine, lysine, methionine, phenylalanine, serine, threonine, tryptophan, tyrosine and valine.

Suitable amino acid esters are in particular esters of amino acids selected from the group consisting of alanine, arginine, asparagine, aspartic acid, glutamic acid, glutamine, glycine, histidine, isoleucine, leucine, lysine, methionine, phenylalanine, serine, threonine, tryptophan, tyrosine and valine. Preferred amino acid esters [are] esters derived from the respective amino acids and alcohols with 1 to 20 carbon atoms, preferably 1 to 4 carbon atoms, in particular derived from methanol or ethanol, preferably methanol.

Furthermore, amino acids, in particular amino acid esters, are also suitable in which the amino group is not in the alpha position relative to the acid or ester group.

The accelerators C of formula (I) are easily obtained synthetically. In a first variant, they can be synthesized from reaction of a primary aliphatic, cycloaliphatic, or araliphatic amine of formula (VIa) and, for example, a compound of formula (VIb).

$R^1[NH_2]_n$ (VIa)

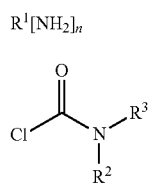

(VIb)

This variant is suitable in particular in cases where the polyamine of formula (VIa) is an ether group-containing aliphatic polyamine, in particular a polyoxyalkylene diamine of formula (V).

This synthesis route is also quite suitable for any cases in which the amine of formula (VIa) is an amino acid or an amino acid ester as already described above.

The compounds of formula (VIb) are easy to obtain or are commercially available. N,N-Dimethylcarbamoyl chloride is especially preferred as the compound of formula (VIb). Depending on the stoichiometry, the reaction occurs in such a way that all amino groups or only some of the amino groups are reacted, i.e., the accelerator C of formula (I) possibly still has amino groups.

A second variant of the synthesis is in particular suitable for the already described cases in which $R^1$ stands for an epoxide EP with n epoxy groups, in which at least one of the n epoxy groups of formula (IIa) has been replaced by groups of formula (Jib). Here the synthesis occurs preferably so that an epoxide EP of formula (VIIa) is reacted with a urea of formula (VIIb) to form an accelerator of formula (I), in particular to form an accelerator of formula (Ia) or (Ib).

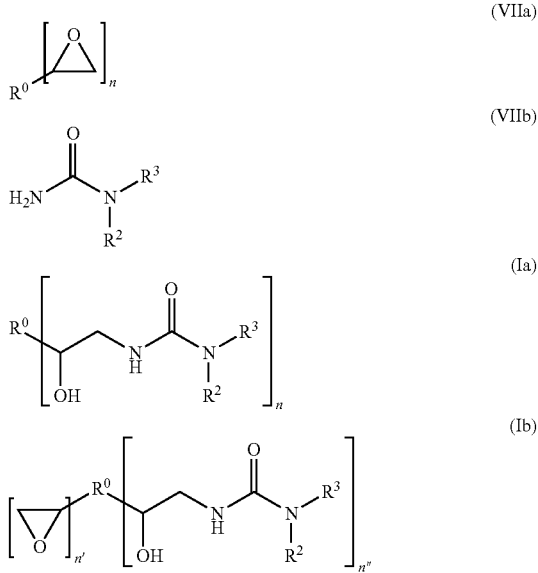

Here $R^0$ is the radical of the above-indicated epoxide after removal of n epoxy groups. Furthermore, n' stands for an integer from 0 to 9 and n" stands for an integer from 1 to 10, provided that the sum of n' and n" gives the number n.

The ureas of formula (VIIb) are easily obtained. N,N-Dimethylurea is especially preferred as the urea of formula (VIIb). Depending on the stoichiometry, the reaction occurs in such a way that all n epoxy groups or only some of the epoxy groups are reacted, i.e., the accelerator C of formula (I) possibly still has epoxy groups, as is expressed in formula (Ib).

It is an essential feature of the invention that the accelerator is not an "aromatic urea accelerator", i.e., that an aromatic radical is not used as the radical $R^1$, $R^2$, and $R^3$, i.e., in other words, that no aromatic ring is directly bonded to the nitrogen atom of the urea group of accelerator C (an "aromatic urea"). As already mentioned, it is namely compositions containing aromatic accelerators (and thus not according to the invention) that are not storage-stable.

The amount of accelerator C is preferably 0.01-6.0 wt. %, in particular 0.02-4.0 wt. %, preferably 0.02-2.0 wt. %, based on the weight of epoxy resin A.

The heat-curing epoxy resin composition advantageously optionally contains at least one toughener D. The toughener D can be solid or liquid.

The toughener D is in particular selected from the group consisting of blocked polyurethane polymers, liquid rubbers, epoxy resin-modified liquid rubbers, and core/shell polymers.

In one embodiment, this toughener D is a liquid rubber D1 which is an acrylonitrile/butadiene copolymer terminated by carboxyl groups or (meth)acrylate groups or epoxy groups, or is a derivative thereof.

Such liquid rubbers are commercially available, for example, under the name Hypro™ (formerly Hycar®) CTBN and CTBNX and ETBN from Nanoresins AG, Germany or Emerald Performance Materials LLC. Suitable derivatives are in particular elastomer-modified prepolymers having epoxy groups, such as are commercially marketed as the Polydis® product line, preferably from the Polydis® 36xx product line, by the Struktol Company (Schill & Seilacher Group, Germany) or as the Albipox product line (Nanoresins, Germany).

In a further embodiment, the toughener D is a polyacrylate liquid rubber D2 that is completely miscible with liquid epoxy resins, and only separates into microdroplets during curing of the epoxy resin matrix. Such polyacrylate liquid rubbers are available, for example, under the name 20208-XPA from Rohm and Haas.

It is clear to the person skilled in the art that mixtures of liquid rubbers can of course also be used, in particular mixtures of carboxyl-terminated or epoxy-terminated acrylonitrile/butadiene copolymers or derivatives thereof with epoxy-terminated polyurethane prepolymers.

In a further embodiment, the toughener D is a solid toughener which is an organic ion-exchanged layered mineral DE1.

The ion-exchanged layered mineral DE1 can be either a cation-exchanged layered mineral DE1c or an anion-exchanged layered mineral DE1a.

The cation-exchanged layered mineral DE1c here is obtained from a layered mineral DE1', in which at least some of the cations have been exchanged by organic cations. Examples of such cation-exchanged layered minerals DE1c are in particular those which are mentioned in U.S. Pat. No. 5,707,439 or in U.S. Pat. No. 6,197,849. The method for preparation of these cation-exchanged layered minerals DE1c is also described in those patents. The layered mineral DE1' is preferably a sheet silicate. The layered mineral DE1' is particularly preferably a phyllosilicate as are described in U.S. Pat. No. 6,197,849, Column 2, Line 38 to Column 3, Line 5, in particular a bentonite.

Layered minerals DE1' such as kaolinite or a montmorillonite or a hectorite or an illite have been shown to be especially suitable.

At least some of the cations of the layered mineral DE1' are replaced by organic cations. Examples of such cations are n-octylammonium, trimethyldodecylammonium, dimethyldodecylammonium, or bis(hydroxyethyl)octadecylammonium or similar derivatives of amines that can be obtained from natural fats and oils; or guanidinium cations or amidinium cations; or cations of N-substituted derivatives of pyrrolidine, piperidine, piperazine, morpholine, thiomorpholine; or cations of 1,4-diazobicyclo[2.2.2]octane (DABCO) and 1-azobicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine, and 2,2'-bipyridine. Furthermore, cyclic amidinium cations are suitable, in particular those such as are disclosed in U.S. Pat. No. 6,197,849 in Column 3, Line 6 to Column 4, Line 67. Compared with linear ammonium compounds, cyclic ammonium compounds are distinguished by elevated thermal stability, since thermal Hofmann degradation cannot occur with them.

Preferred cation-exchanged layered minerals DE1c are familiar to the person skilled in the art under the term organoclay or nanoclay, and are commercially available, for example, under the group names Tixogel® or Nanofil® (Südchemie), Cloisite® (Southern Clay Products), or Nanomer® (Nanocor, Inc.), or Garamite® (Rockwood).

The anion-exchanged layered mineral DE1a here is obtained from a layered mineral DE1'', in which at least some of the anions have been exchanged by organic anions. An example of such an anion-exchanged layered mineral DE1a is a hydrotalcite DE1''', in which at least some of the interlayer carbonate anions have been exchanged by organic anions.

It is also quite possible for the composition to simultaneously contain a cation-exchanged layered mineral DE1c and an anion-exchanged layered mineral DE1a.

In a further embodiment, the toughener D is a solid toughener which is a block copolymer DE2. The block copolymer DE2 is obtained from an anionic or controlled free-radical polymerization of methacrylic acid ester with at least one other monomer having an olefinic double bond. Particularly preferred as a monomer having an olefinic double bond is one in which the double bond is conjugated directly with a hetero atom or with at least one other double bond. Particularly suitable monomers are selected from the group including styrene, butadiene, acrylonitrile, and vinyl acetate. Acrylate/styrene/acrylic acid (ASA) copolymers, available, for example, under the name GELOY 1020 from GE Plastics, are preferred.

Especially preferred block copolymers DE2 are block copolymers derived from methacrylic acid methyl ester, styrene, and butadiene. Such block copolymers are available, for example, as triblock copolymers under the group name SBM from Arkema.

In a further embodiment, the toughener D is a core/shell polymer DE3. Core/shell polymers consist of an elastic core polymer and a rigid shell polymer. Particularly suitable core/shell polymers consist of a core made from elastic acrylate or butadiene polymer which is enclosed in a rigid shell made from a rigid thermoplastic polymer. This core/shell structure is either formed spontaneously through separation of a block copolymer or is determined by latex polymerization or suspension polymerization followed by grafting. Preferred core/shell polymers are "MBS polymers," which are commercially available under the trade names Clearstrength™ from Atofina, Paraloid™ from Rohm and Haas, or F-351™ from Zeon.

Core/shell polymer particles that are optionally in suspension are especially preferred. Examples of these are GENIOPERL M23A from Wacker with a polysiloxane core and an acrylate shell, radiation crosslinked rubber particles of the NEP series manufactured by Eliokem, or Nanoprene from Lanxess or Paraloid EXL from Rohm and Haas or Kane ACE MX-120 from Kaneka.

Other comparable examples of core/shell polymers are sold under the name Albidur™ by Nanoresins AG, Germany.

Nanoscale silicates in an epoxy matrix are also suitable, such as are sold under the trade name Nanopox from Nanoresins AG, Germany.

In a further embodiment, the toughener D is a reaction product DE4 between a carboxylated solid nitrile rubber and excess epoxy resin.

In a further embodiment, the toughener D is a blocked polyurethane polymer of formula (IV).

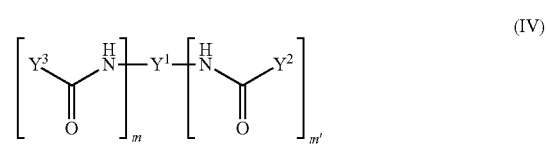

(IV)

Here m and m' each stand for numbers between 0 and 8, provided that m+m! stands for a number from 1 to 8.

Preferably m is different from 0.

Furthermore, $Y^1$ stands for a linear or branched polyurethane polymer PU1 terminated by m+m' isocyanate groups, after removal of all terminal isocyanate groups.

$Y^2$ each independently stands for a blocking group which is cleaved at a temperature above 100° C.

$Y^3$ each independently stands for a group of formula (IV').

(IV')

Here $R^4$ in turn stands for an aliphatic, cycloaliphatic, aromatic, or araliphatic epoxide containing a primary or secondary hydroxyl group, after removal of the hydroxy and epoxy groups, and p stands for the numbers 1, 2, or 3.

In this document, "araliphatic radical" means an aralkyl group, i.e., an alkyl group substituted by aryl groups (see Römpp, CD Römpp Chemie Lexikon [Römpp Chemistry Encyclopedia], Version 1, Stuttgart/New York, Georg Thieme Verlag 1995).

$Y^2$ each independently stands in particular for a substituent selected from the group consisting of

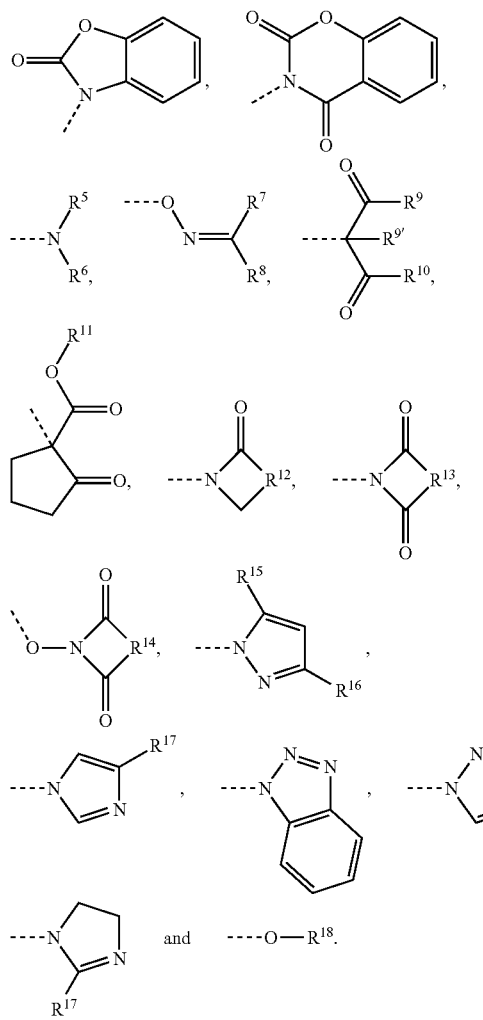

Here $R^5$, $R^6$, $R^7$, and $R^8$ each independently stand for an alkyl or cycloalkyl or aralkyl or arylalkyl group, or else $R^5$ together with $R^6$, or $R^7$ together with $R^8$ forms part of a 4- to 7-membered ring, which is optionally substituted.

Furthermore, $R^9$, $R^{9'}$, and $R^{10}$ each independently stands for an alkyl or aralkyl or arylalkyl group or for an alkyloxy or aryloxy or aralkyloxy group, and $R^{11}$ stands for an alkyl group.

$R^{12}$, $R^{13}$, and $R^{14}$ each independently stand for an alkylene group with 2 to 5 C atoms, which optionally has double bonds or is substituted, or for a phenylene group or for a hydrogenated phenylene group, and $R^{15}$, $R^{16}$, and $R^{17}$ each independently stand for H or for an alkyl group or for an aryl group or an aralkyl group.

Finally, $R^{18}$ stands for an aralkyl group or for a mononuclear or polynuclear substituted or unsubstituted aromatic group, which optionally has aromatic hydroxyl groups.

The dashed lines in the formulas in this document in each case represent bonding between the respective substituents and the corresponding molecular moiety.

Phenols or bisphenols, after removal of an hydroxyl group, are in particular firstly to be considered as $R^{18}$. Preferred examples of such phenols and bisphenols are in particular phenol, cresol, resorcinol, pyrocatechol, cardanol (3-pentadecenylphenol (from cashew nutshell oil)), nonylphenol, phenols reacted with styrene or dicyclopentadiene, bisphenol A, bisphenol F, and 2,2'-diallyl bisphenol A.

Hydroxybenzyl alcohol and benzyl alcohol, after removal of an hydroxyl group, are in particular secondly to be considered as $R^{18}$.

If $R^5$, $R^6$, $R^7$, $R^8$, $R^9$, $R^{9'}$, $R^{10}$, $R^{11}$, $R^{15}$, $R^{16}$ or $R^{17}$ stands for an alkyl group, the latter is in particular a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$, or $R^{18}$ stands for an aralkyl group, the latter group is in particular an aromatic group bonded through methylene, in particular a benzyl group.

If $R^5$, $R^6$, $R^7$, $R^8$, $R^9$, $R^{9'}$, or $R^{10}$ stands for an alkylaryl group, the latter group is in particular a $C_1$ to $C_{20}$ alkyl group bonded through phenylene such as, for example, tolyl or xylyl.

Especially preferred radicals $Y^2$ are radicals selected from the group consisting of

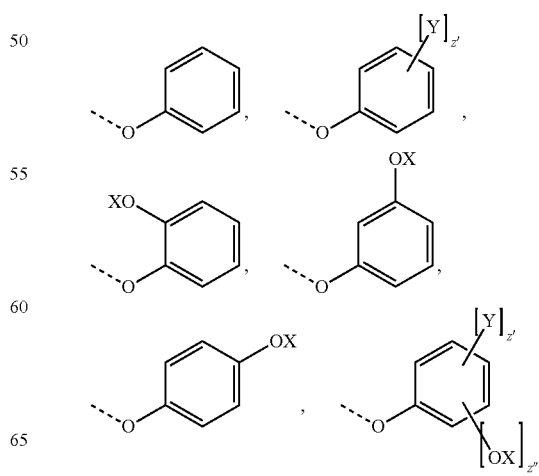

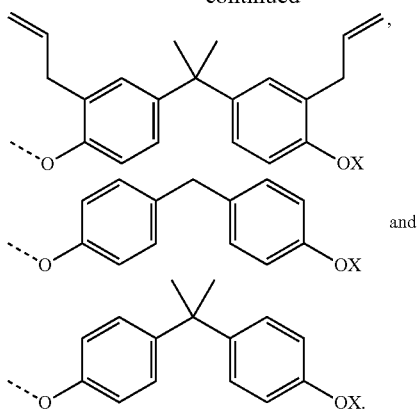

The radical Y here stands for a saturated or olefinic unsaturated hydrocarbon radical with 1 to 20 C atoms, in particular with 1 to 15 C atoms. Allyl, methyl, nonyl, dodecyl or an unsaturated $C_{15}$ alkyl radical with 1 to 3 double bonds are particularly preferred as Y.

The radical X stands for H or for an alkyl, aryl, aralkyl group, in particular for H or methyl.

The subscripts z' and z" stand for the numbers 0, 1, 2, 3, 4, or 5, provided that the sum z'+z" stands for a number between 1 and 5.

The blocked polyurethane polymer of formula (IV) is synthesized from isocyanate group-terminated linear or branched polyurethane polymers PU1 and one or more isocyanate-reactive compounds $Y^2H$ and/or $Y^3H$. If more than one such isocyanate-reactive compound is used, the reaction can be carried out sequentially or with a mixture of these compounds.

The reaction is carried out in such a way that the one or more isocyanate-reactive compounds $Y^2H$ and/or $Y^3H$ are used in stoichiometric amounts or in stoichiometric excess, in order to ensure that all the NCO groups are reacted.

The isocyanate-reactive compound $Y^3H$ is a monohydroxyl epoxy compound of formula (IVa).

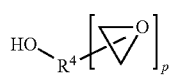

(IVa)

If more than one such monohydroxyl epoxy compound is used, the reaction can be carried out sequentially or with a mixture of these compounds.

The monohydroxyl epoxy compound of formula (IVa) has 1, 2, or 3 epoxy groups. The hydroxyl group of this monohydroxyl epoxy compound (IVa) can be a primary or a secondary hydroxyl group.

Such monohydroxyl epoxy compounds can, for example, be produced by reaction of polyols with epichlorohydrin. Depending on how the reaction is carried out, when polyfunctional alcohols are reacted with epichlorohydrin, the corresponding monohydroxyl epoxy compounds are also formed as byproducts in different concentrations. The latter can be isolated by means of conventional separation operations. Generally, however, it is sufficient to use the product mixture obtained in the polyol glycidylization reaction, consisting of the polyol reacted completely and partially to form the glycidyl ether. Examples of such hydroxyl-containing epoxides are butanediol monoglycidyl ethers (present in butanediol diglycidyl ethers), hexanediol monoglycidyl ethers (present in hexanediol diglycidyl ethers), cyclohexanedimethanol glycidyl ethers, trimethylolpropane diglycidyl ethers (present as a mixture in trimethylolpropane triglycidyl ethers), glycerol diglycidyl ethers (present as a mixture in glycerol triglycidyl ethers), pentaerythritol triglycidyl ethers (present as a mixture in pentaerythritol tetraglycidyl ethers). It is preferable to use trimethylolpropane diglycidyl ether, which occurs in a relatively high proportion in conventionally synthesized trimethylolpropane triglycidyl ether.

However, other similar hydroxyl-containing epoxides can also be used, in particular glycidol, 3-glycidyloxybenzyl alcohol, or hydroxymethyl cyclohexene oxide.

Also preferred is the β-hydroxy ether of formula (IVb), which is present in a proportion up to 15% in commercially available liquid epoxy resins, synthesized from bisphenol A (R=$CH_3$) and epichlorohydrin, as well as the corresponding β-hydroxy ethers of formula (IVb), which are formed when

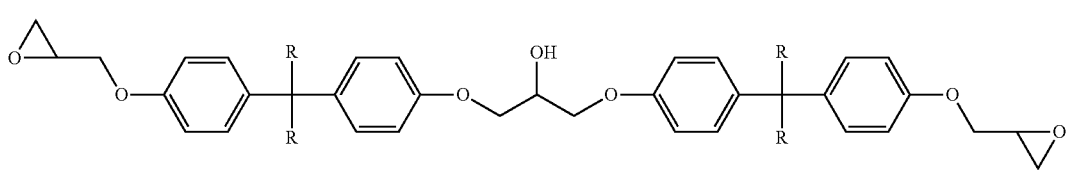

(IVb)

bisphenol F (R=H) or the mixture of bisphenol A and bisphenol F is reacted with epichlorohydrin.

Also preferred are distillation residues produced during manufacture of high-purity distilled liquid epoxy resins. Such distillation residues have an hydroxyl-containing epoxide concentration up to three times higher than in commercially available undistilled liquid epoxy resins. Furthermore, very different epoxides with a β-hydroxy ether group, synthesized by reaction of (poly)epoxides with a substoichiometric amount of monovalent nucleophiles such as carboxylic acids, phenols, thiols, or secondary amines, can also be used.

A trivalent radical of the following formula is particularly preferred as the radical $R^4$:

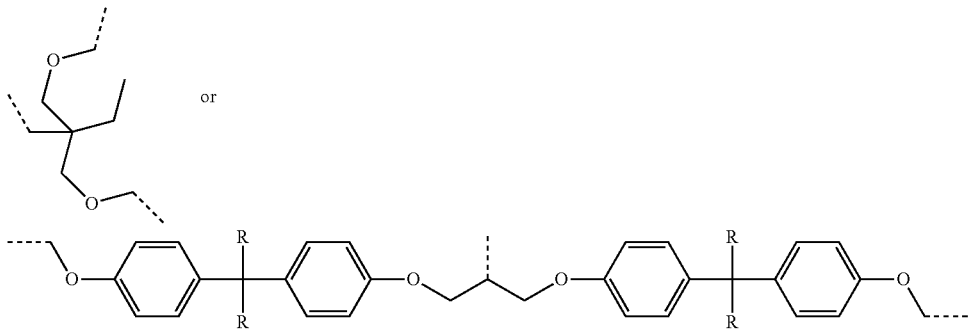

where R stands for methyl or H.

The free primary or secondary OH functional group of the monohydroxyl epoxy compound of formula (IVa) allows for efficient reaction with terminal isocyanate groups of polymers without needing to use unusual excesses of the epoxy component.

The polyurethane polymer PU1 on which $Y^1$ is based can be synthesized from at least one diisocyanate or triisocyanate and at least one polymer $Q_{PM}$ having terminal amino, thiol, or hydroxyl groups and/or one optionally substituted polyphenol $Q_{PP}$.

Suitable diisocyanates are, for example, aliphatic, cycloaliphatic, aromatic, or araliphatic diisocyanates, in particular commercially available products such as methylene diphenyl diisocyanate (MDI), 1,4-butane diisocyanate, hexamethylene diisocyanate (HDI), toluene diisocyanate (TDI), tolidine diisocyanate (TODI), isophorone diisocyanate (IPDI), trimethyl hexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), or m-tetramethylxylylene diisocyanate (TMXDI) as well as dimers thereof. HDI, IPDI, MDI, or TDI are preferred.

Suitable triisocyanates are, for example, trimers or biurets of aliphatic, cycloaliphatic, aromatic, or araliphatic diisocyanates, in particular the isocyanurates and biurets of the diisocyanates described in the previous paragraph.

Of course, suitable mixtures of diisocyanates or triisocyanates can also be used.

Suitable polymers $Q_{PM}$ having terminal amino, thiol, or hydroxyl groups are in particular polymers $Q_{PM}$ having two or three terminal amino, thiol, or hydroxyl groups.

Suitable polymers $Q_{PM}$ are in particular those such as are disclosed, for example, in WO 2008/049857 A1, in particular the $Q_{PM}$ on page 7, Line 25 to page 11, Line 20, the contents of which in particular are incorporated herein by reference.

The polymers $Q_{PM}$ advantageously have a weight per equivalent of 300-6000, in particular 600-4000, preferably 700-2200 g/equivalent of NCO-reactive groups.

Suitable polymers $Q_{PM}$ are in particular polyoxyalkylene polyols, also called polyether polyols, hydroxy-terminated polybutadiene polyols, styrene/acrylonitrile grafted polyether polyols, polyhydroxy-terminated acrylonitrile/butadiene copolymers, polyester polyols, as well as polycarbonate polyols.

Particularly suitable as the polyphenol $Q_{PP}$ are bisphenols, trisphenols, and tetraphenols. This means not only pure phenols but optionally also substituted phenols. The nature of the substitution can be quite diverse. In particular, this means a direct substitution on the aromatic ring to which the phenol OH group is bonded. By phenols furthermore is meant not only mononuclear aromatics but also polynuclear or condensed aromatics or heteroaromatics having phenol OH groups directly on the aromatic or heteroaromatic rings.

Bisphenols and trisphenols are especially suitable. For example, suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, phenolphthalein, fluorescein, 4,4'-[bis(hydroxyphenyl)-1,3-phenylenebis(1-methylethylidene)]bisphenol M), 4,4'-bis(hydroxyphenyl)-1,4-phenylenebis(1-methylethylidene)] (=bisphenol P), 2,2'-diallyl bisphenol A, diphenols and dicresols synthesized by reacting phenols or cresols with diisopropylidene benzene, phloroglucinol, gallic acid esters, phenol or cresol novolacs with number of OH functional groups ranging from 2.0 to 3.5, as well as all isomers of the aforementioned compounds.

Especially suitable tougheners D optionally present in the composition are tougheners which are amphiphilic hydroxyl group-containing block copolymers, such as are marketed under the trade name Fortegra™, in particular Fortegra™ 100, by Dow Chemical, or their reaction products with polyisocyanates and optionally other isocyanate-reactive compounds.

Especially suitable as the toughener D optionally present in the composition are those such as are disclosed in the following articles or patents, whose contents are incorporated herein by reference:

EP 0 308 664 A1, in particular formula (I), especially page 5, Line 14 to page 13, Line 24; EP 0 338 985 A1, EP 0 353 190 A1, WO 00/20483 A1, in particular formula (I), especially page 8, Line 18 to page 12, Line 2; WO 01/94492 A1, in particular the reaction products denoted as D) and E), especially page 10, Line 15 to page 14, Line 22; WO 03/078163 A1, in particular the acrylate-terminated polyurethane resin denoted as B), especially page 14, Line 6 to page 14, Line 35; WO 2005/007766 A1, in particular formula (I) or (II), especially page 4, Line 5 to page 11, Line 20; EP 1 728 825 A1, in particular formula (I), especially page 3, Line 21 to page 4, Line 47; WO 2006/052726 A1, in particular the amphiphilic block copolymer denoted as b), especially page 6, Line 17 to page 9, Line 10; WO 2006/052729 A1, in particular the amphiphilic block copolymer denoted as b), especially page 6, Line 25 to page 10, Line 2; T. J. Hermel-Davidock et al., *J. Polym. Sci. Part B: Polym. Phys.*, 45, 3338-3348 (2007), in particular the ambiphilic block copolymers, especially page 3339, 2nd column to page 3341, 2nd column; WO 2004/055092 A1, in particular formula (I), especially page 7, Line 28 to page 13, Line 15; WO 2005/007720 A1, in particular formula (I), especially page 8, Line 1 to page 17, Line 10; WO 2007/020266 A1, in particular formula (I), especially page 3, Line 1 to page 11, Line 6; WO 2008/049857 A1, in particular formula (I), especially page 3, Line 5 to page 6, Line 20; WO 2008/049858 A1, in particular formula (I) and (II), especially page 6, Line 1 to page 12, Line 15; WO 2008/049859 A1, in particular formula (I), especially page 6, Line 1 to page 11, Line 10; WO 2008/049860 A1, in particular formula (I), especially page 3, Line 1 to page 9, Line 6; as well as DE-A-2 123 033, US 2008/0076886 A1, WO 2008/016889, and WO 2007/025007.

It has been shown that advantageously more than one toughener is present in the composition, in particular also more than one toughener D.

The proportion of toughener D is advantageously used in an amount of 1-35 wt. %, in particular 1-25 wt. %, based on the weight of the composition.

In a further preferred embodiment, the composition in addition contains at least one filler F. Here the filler is preferably mica, talc, kaolin, wollastonite, feldspar, syenite, chlorite, bentonite, montmorillonite, calcium carbonate (precipitated or ground), dolomite, quartz, silicic acids (pyrogenic or precipitated), cristobalite, calcium oxide, aluminum hydroxide, magnesium oxide, hollow ceramic spheres, hollow glass spheres, hollow organic spheres, glass spheres, colored pigments. As the Filler F, we mean both organic coated and uncoated commercially available forms familiar to the person skilled in the art.

Another example is functionalized alumoxanes, for example as described in U.S. Pat. No. 6,322,890.

The total proportion of total filler F is advantageously 3-50 wt. %, preferably 5-35 wt. %, in particular 5-25 wt. %, based on the weight of the total composition.

In a further preferred embodiment, the composition contains a physical or chemical blowing agent, as is available, for example, under the trade name Expancel™ from Akzo Nobel, or Celogen™ from Chemtura, or under the trade name Luvopor® from Lehmann & Voss. The proportion of the blowing agent is advantageously 0.1-3 wt. %, based on the weight of the composition.

In another preferred embodiment, the composition in addition contains at least one epoxy group-containing reactive diluent G. These reactive diluents G are in particular those epoxy group-containing reactive diluents as have already been described above as epoxides EP.

The total proportion of epoxy group-containing reactive diluent G is advantageously 0.1-20 wt. %, preferably 0.1-8 wt. %, based on the weight of the total composition.

In addition, the heat-curing epoxy resin composition can contain a thixotropic agent H based on a urea derivative. The urea derivative is in particular a reaction product between an aromatic monomeric diisocyanate and an aliphatic amine compound. It is also quite possible to react more than one different monomeric diisocyanates with one or more aliphatic amine compounds, or to react a monomeric diisocyanate with more than one aliphatic amine compounds. The reaction product between 4,4'-diphenylmethylene diisocyanate (MDI) and butylamine has proven to be especially advantageous.

The urea derivative is preferably present in a carrier. The carrier can be a plasticizer, in particular a phthalate or an adipate, preferably a diisodecylphthalate (DIDP) or dioctyladipate (DOA). The carrier can also be a non-diffusing carrier. This is preferred in order to ensure the least possible migration of the unreacted components after curing. Blocked polyurethane prepolymers are preferred as the non-diffusing carrier.

Preparation of such preferred urea derivatives and carriers is described in detail in the patent application EP 1 152 019 A1. The carrier is advantageously a blocked polyurethane prepolymer, in particular obtained by reaction of a trifunctional polyether polyol with IPDI, followed by blocking of the terminal isocyanate groups by s-caprolactam.

The total proportion of thixotropic agent H is advantageously 0-40 wt. %, preferably 5-25 wt %, based on the weight of the total composition. The ratio of the weight of the urea derivative to the weight of the optionally present carrier is preferably 2:98 to 50:50, in particular 5:95-25:75.

The composition can include other components, in particular catalysts, stabilizers, in particular heat and/or light stabilizers, thixotropic agents, plasticizers, solvents, mineral or organic fillers, blowing agents, dyes and pigments, corrosion inhibitors, surfactants, defoamers, and adhesion promoters.

Suitable plasticizers are in particular phenyl alkylsulfonic acid esters or N-butyl benzenesulfonamide, such as are commercially available as Mesamoll® or Dellatol BBS from Bayer.

Suitable stabilizers are in particular optionally substituted phenols such as BHT or Wingstay® T (Elikem), sterically hindered amines, or N-oxyl compounds such as TEMPO (Evonik)

It has been shown that the heat-curing epoxy resin compositions described are especially suitable for use as one-component adhesives, in particular as heat-curing one-component bodyshell adhesives in vehicle assembly. Such a one-component adhesive has broad applications. Here heat-curing one-component adhesives can be realized in particular that are distinguished by high impact strength both at elevated temperatures and especially at low temperatures, in particular between 0° C. and −40° C. Such adhesives are needed for bonding heat-stable materials. "Heat-stable materials" means materials which, for a cure temperature of 100° C.-220° C., preferably 120° C.-200° C., are shape-stable at least during the cure time. Here the heat-stable materials in particular are metals and plastics such as ABS, polyimide, polyphenylene ethers, composite materials such as SMC, glass fiber reinforced unsaturated polyesters, epoxy or acrylate composites. A preferred use is when at least one material is a metal. An especially preferred use is bonding of identical or different metals, in particular in bodyshells in the automobile industry. Preferred metals are especially steel, in particular electrogalvanized steel, hot-dip galvanized steel, lubricated steel, Bonazinc-coated steel, and subsequently phosphatized steel as well as aluminum, in particular the types commonly used in automobile assembly.

Using an adhesive based on a heat-curing composition according to the invention, it is possible to achieve the desired combination of high crash resistance and both high and low cure temperature.

Such an adhesive in particular is first brought into contact with the materials to be bonded at a temperature between 10° C. and 80° C., in particular between 10° C. and 60° C., and is subsequently cured at a temperature of typically 100° C.-220° C., preferably 120°-200° C.

A further aspect of the present invention relates to a method for bonding heat-stable substrates, including the following steps:

i) Application of a heat-curing epoxy resin composition, as described in detail above, to the surface of a heat-stable substrate S1, in particular a metal;

ii) Bringing the applied heat-curing epoxy resin composition into contact with the surface of another heat-stable substrate S2, in particular a metal;

iii) Heating the composition to a temperature of 100° C.-220° C., in particular 120° C.-200° C., preferably between 160° C. and 190° C.

Substrate S2 here consists of material which is the same as or different from substrate S1.

The substrates S1 and/or S2 are in particular the metals and plastics mentioned above.

Such a method for bonding heat-stable materials results in a bonded article. Such an article is preferably a vehicle or part of a vehicle.

Of course, in addition to heat-curing adhesives, sealants or coatings can also be realized with a composition according to the invention. Furthermore, the compositions according to the invention are not only suitable for automobile assembly but are also suitable for other areas of application.

We should especially mention related applications in assembly of means of transportation such as ships, trucks, buses, or track vehicles, or in assembly of consumer goods such as, for example, washing machines.

The materials bonded by means of a composition according to the invention are used at temperatures between typically 120° C. and −40° C., preferably between 100° C. and −40° C., in particular between 80° C. and −40° C.

An especially preferred use of the heat-curing epoxy resin composition according to the invention is its use as a heat-curing one-component bodyshell adhesive in vehicle assembly or as stiffening material or as a foamable heat-curing composition for reinforcement in cavities of structural components and reinforcement elements.

A further aspect of the present invention relates to a cured epoxy resin composition, as is obtained by heating a heat-curing epoxy resin composition as described in detail above. Heating occurs typically in an oven at a temperature of 100° C.-220° C., in particular 120° C.-200° C., preferably between 160° C. and 190° C.

It has been shown that accelerators of formula (I), as have already been described in detail above as a component of a heat-curing epoxy resin composition, are generally suitable as accelerators for heat-curing epoxy resin compositions. Thus a further aspect of the present invention relates to use of an accelerator of formula (I), as has already been described in detail above in a heat-curing epoxy resin composition, for acceleration of curing of heat-curing epoxy resin compositions.

As a result of addition of an accelerator C of formula (I) to a heat-curing epoxy resin composition, on the one hand the acceleration thereby appears to occur significantly faster at a given cure temperature than for the corresponding composition without accelerator C of formula (I).

On the other hand, it could be established that by addition of an accelerator C of formula (I) to a heat-curing epoxy resin composition, the latter can be cured at significantly lower temperature than is the case without an accelerator C of formula (I). In DSC, this is apparent in a shift of the reaction peak, or by a shift of the "onset point" to lower temperatures for the first heating of an epoxy resin mixture containing an accelerator C, compared with the corresponding composition without accelerator C of formula (I). For example, epoxy resin compositions with dicyanodiamide as curing agent B, even with small additions, typically 0.4% to 3%, of an accelerator of formula (I), can be cured at temperatures that lie as much as 20° C. or sometimes even more below the temperature for the corresponding epoxy resin composition without an accelerator of formula (I).

Addition of an accelerator of formula (I), however, does not have a very negative impact on the storage stability of the corresponding epoxy resin composition, quite the opposite of the (not according to the invention) aromatic urea accelerators.

Although curing occurs at lower temperatures, there is little or no negative impact on the glass transition temperature (Tg) of the cured epoxy resin composition.

Furthermore, addition of an accelerator of formula (I) also does not have a negative effect on the impact strength properties of the toughener-containing heat-curing epoxy resin compositions, as is the case for certain (not according to the invention) aliphatic urea accelerators. Quite the contrary, it was even discovered that the impact strength can even be appreciably increased when using accelerators of formula (I).

EXAMPLES

Curing Agents for Epoxy Resins

N,N'-Dimethylurea (=1,3-dimethylurea)("DMH")

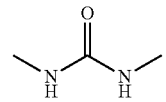

The N,N'-dimethylurea was obtained from Fluka, Switzerland.

N,N,N',N'-Tetramethylurea   1,1,3,3-tetramethylurea) ("TMH")

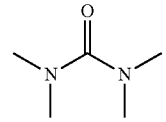

The N,N'-tetramethylurea was obtained from Fluka, Switzerland.

3,3'-(4-Methyl-1,3-phenylene)bis(1,1-dimethylurea) ("MPBDMH")

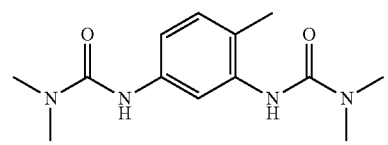

3,3'-(4-methyl-1,3-phenylene)bis(1,1-dimethylurea) was obtained from Sigma-Aldrich, Switzerland.

3-(3-Hydroxypropyl)-1,1-diethylurea ("C-1")

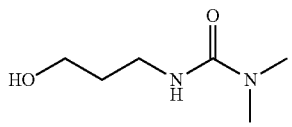

15.0 g (139.5 mmol) of N,N-dimethylcarbamoyl chloride and 80 mL dioxane were added to a 250 mL two-necked flask with a reflux condenser. Then 13.66 g (135 mmol) triethylamine and 10.44 g (139 mmol) of 3-amino-1-propanol were added. After exothermic evolution of heat subsided, the mixture was stirred for 1 h at 60° C. and for 3 h at 90° C., where a light brown suspension slowly formed. After the suspension had been cooled down to 50° C., the solid was filtered out.

The solvent was driven off on the rotary evaporator at 60° C. Then the product was purified with stirring for 2 h at 100° C. and 10 mbar. 17.0 g of a brown, viscous liquid was obtained.

Reaction Product of N,N-dimethylcarbamoyl chloride/Jeffamine® D-230 ("C-2")

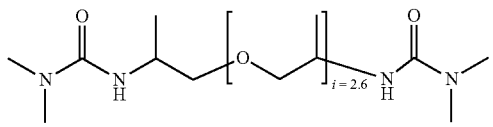

15.0 g (139.5 mmol) of N,N-dimethylcarbamoyl chloride and 80 mL dioxane were added to a 250 mL two-necked flask with a reflux condenser. Then 13.66 g (135 mmol) triethylamine and 14.88 g (approx. 63 mmol) Jeffamine® D-230 (Huntsman) were added. After the slight exothermic evolution of heat subsided, the mixture was stirred for 3 h at 80° C. and for 1 h at 100° C., where a milky yellowish suspension slowly formed. The suspension obtained in this way was filtered twice through a fluted filter. The solvent was driven off on the rotary evaporator at 60° C. Then the product was purified with stirring for 2 h at 100° C. and 0.3 mbar. Approximately 17.0 g of an orange-red, viscous liquid was obtained, with a calculated "urea equivalent weight" of approx. 191 g/eq.

Reaction Product of N,N-dimethylcarbamoyl chloride/tyrosine methyl ester ("C-3")

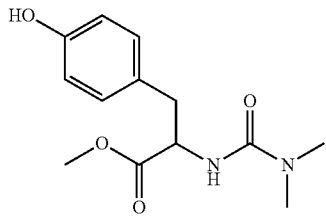 [SMILES: COC(=O)C(Cc1ccc(O)cc1)NC(=O)N(C)C]

9.07 g (46.5 mmol) of tyrosine methyl ester and 50 mL dioxane were weighed out into a 250 mL two-necked flask. Then first 4.55 g (45.0 mmol) triethylamine and then 5.0 g (46.5 mmol) of N,N-dimethylcarbamoyl chloride were added. After the exothermic evolution of heat subsided, the mixture was stirred for 2 h at 70° C., where a yellowish, increasingly difficultly stirrable suspension slowly formed.

The suspension obtained in this way was filtered through a Nutsche sintered glass filter. The solvent was driven off on the rotary evaporator at 60° C. 12.0 g of a light orange powder was obtained.

Reaction product of N,N-dimethylurea/bisphenol A diglycidyl ether ("C-4")

20.0 g (approx. 116 mmol epoxy groups) of distilled bisphenol A diglycidyl ether (Epilox A 17-01), 10.0 g (113.5 mmol) of N,N-dimethylurea, and 40 mL ethanol were added to a 250 mL two-necked flask with a reflux condenser. It was refluxed for 7 h at 90° C.; only traces of N,N-dimethylurea were still detectable toward the end of the reaction. After the solvent had been driven off at 60° C. on the rotary evaporator, approx. 30 g of a highly viscous, partially waxy material with a "urea equivalent weight" of approx. 258 g/eq was obtained.

Reaction product of N,N-dimethylurea/solid epoxy resin ("C-5")

50.0 g (approx. 69 mmol epoxy groups) of solid epoxy resin Araldite® GT-7004, 6.04 g (68.5 mmol) of N,N-dimethylurea, and 250 mL ethanol were added to a 500 mL two-necked flask with a reflux condenser. After 6 h of reflux at 90° C. bath temperature, the epoxide content dropped down to approx. 0.1 eq/kg, at which point the reaction was stopped. After the solvent was driven off at 60° C. on the rotary evaporator and the crude product had been dried for 6 h at 50° C. in the vacuum oven at 50 mbar, approx. 55 g of a hard solid was obtained. The product, with a calculated "urea equivalent weight" of approx. 820 g/eq, was crushed in the mortar.

Reaction product of N,N-dimethylurea/novolac epoxy resin ("C-6")

25.0 g (approx. 140 mmol epoxy groups) of epoxidized novolac D.E.N. 438, 12.3 [g] (140 mmol) of N,N-dimethylurea, and 120 mL ethanol were added to a 500 mL two-necked flask with a reflux condenser. On elevation of the temperature, a 2-phase mixture was obtained.

After 7 h of reflux at 90° C. bath temperature, the epoxide content dropped down to approx. 0.2 eq/kg, at which point the reaction was stopped. After the solvent was driven off at 60° C. on the rotary evaporator and the crude product had been dried for 6 h at 50° C. in the vacuum oven at 50 mbar, approx. 35 g of an at first partially hard, partially jelly-like solid was obtained. After storage for a week at room temperature, the product, with a calculated "urea equivalent weight" of approx. 267 g/eq, was hard and could be crushed in the mortar.

Preparation of a Toughener ("D-1")

150 g of Poly-THF 2000 (OH value 57 mg/g KOH) and 150 [g] of Liquiflex H(OH value 46 mg/g KOH) were dried for 30 minutes under vacuum at 105° C. After the temperature had been lowered to 90° C., 61.5 g IPDI and 0.14 g dibutyltin dilaurate were added. The reaction was run under vacuum at 90° C. until the NCO content was constant at 3.10%, after 2.0 h (calculated NCO content: 3.15%). Then 96.1 g of cardanol was added as a blocking agent. Stirring was continued at 105° C. under vacuum until the NCO content dropped below 0.1%, after 3.5 h. The product was then used as toughener D-1.

TABLE 1

Raw materials used.

| | |
|---|---|
| D.E.R. 330 (bisphenol A diglycidyl ether = "DGEBA") | Dow |
| Polypox R7 (tert-butyl phenyl glycidyl ether = "Polypox") | UPPC |
| Polydis 3614, epoxy resin-modified CTBN (="Polydis") | Struktol |
| Dicyanodiamide (="Dicy") | Degussa |
| Poly-THF 2000 (difunctional polybutylene glycol) (OH equivalent weight = approx. 1000 g/OH equivalent) | BASF |
| Liquiflex H (hydroxyl-terminated polybutadiene) (OH equivalent weight = approx. 1230 g/OH equivalent) | Krahn |
| Isophorone diisocyanate (="IPDI") | Evonik |
| Cardolite NC-700 (cardanol, meta-substituted alkenyl monophenol) | Cardolite |

Preparation of Compositions

The reference compositions Ref.1-Ref.4 as well as the compositions according to the invention 1, 2, 3, 4, 5 and 6 were prepared as indicated in Table 2.

In the Reference Examples, either no accelerator (Ref.1) or accelerators not corresponding to formula (I) were used in each case, while an accelerator corresponding to formula (I) was used for Examples 1, 2, 3, 4, 5, and 6. The amounts of the accelerator used were calculated so that the total concentration of urea groups was constant.

Test Methods:

Tensile Shear Strength (TSS) (DIN EN 1465)

The test pieces were prepared from the compositions described and with electrogalvanized DC04 steel (eloZn) of dimensions 100×25×0.8 mm, where the adhesion surface area was 25×10 mm with a layer thickness of 0.3 mm. They were cured for 30 min at 180° C. ("TSS$_{180}$"), or for 10 min at 165° C. ("TSS$_{165}$") in a convection oven. The measurement was made after cooling down to room temperature after a day, with a pull rate of 10 mm/min.

Impact/Peel Work (ISO 11343)

The test pieces were prepared from the compositions described and with electrogalvanized DC04 steel (eloZn) of dimensions 90×20 x 0.8 mm, where the adhesion surface area was 20×30 mm with a layer thickness of 0.3 mm. They were cured for 30 min at 180° C. The impact/peel work for each was measured at 23° C. The impact velocity was 2 m/s. The area under the measurement curve (from 25% to 90%, according to ISO 11343) is given as the fracture energy (FE) in joules.

As the increase in impact strength compared with Reference Example Ref.1, the value of $\Delta_{FE}$ in the table (given in %) was determined according to the following formula:

$$\Delta_{FE}=[FE/FE(Ref.1)]-1.$$

Viscosity

The adhesive test samples were measured on a Bpj;om CVO 120 viscometer, plate/plate (diameter 25 mm, gap 1 mm), frequency 5 Hz, 0.01 deflection, temperature 23° C.-53° C., 10° C./min. The viscosity was determined as the complex viscosity at 25° C. from the measured curve.

The adhesives were stored after preparation for 1 day at 25° C. or for 1 week at 60° C. After cooling down to room temperature, the viscosity was measured and given in Table 2 as "Visc (1 d, 25° C.) or as "Visc (1 w, 60° C.). The increase in viscosity ($\Delta_{visc}$) was calculated (given in %) according to the formula $$[Visc(1\ w, 60°\ C.)/Visc(1\ d, 25°\ C.)]-1.$$

DSC was run for each epoxy resin composition mixed in this way, on a Mettler DSC 822$^E$ (heating from 25° C. to 250° C., with heating rate of 10° K/minute). First the maximum of the reaction peak was determined as $T_{peak-DSC}$ from the measured curve as well as the onset $T_{onset-DSC}$ calculated from the curve.

Acceleration

DSC was run for each epoxy resin composition mixed in this way, on a Mettler DSC 822$^E$ (heating from 25° C. to 250° C., with heating rate of 10° K/minute). First the maximum of the reaction peak was determined as $T_{peak-DSC}$ from the measured curve as well as the onset $T_{onset-DSC}$ calculated from the curve.

Glass Transition Temperature ($T_g$)

The glass transition temperature was determined by DSC. A Mettler DSC 822$^e$ was used for this purpose. 10-20 mg of each composition was weighed out in an aluminum crucible. After the test sample had been cured in the DSC for 30 min at 175° C., the test sample was cooled down to −20° C. (minus 20° C.) and then heated up to 150° C. at a heating rate of 10° C./min. The glass transition temperature was determined from the measured DSC curve using the DSC software.

The results of these tests are summarized in Table 2.

TABLE 2

Compositions and results.

| | Ref.1 | Ref.2 | Ref.3 | Ref.4 | 1 | 2 | 3 | 4 | 5 | 6 |
|---|---|---|---|---|---|---|---|---|---|---|
| DGEBA [PBW$^1$] | 40.0 | 40.0 | 40.0 | 40.0 | 40.0 | 40.0 | 40.0 | 40.0 | 40.0 | 40.0 |
| Polypox [PBW$^1$] | 3.0 | 3.0 | 3.0 | 3.0 | 3.0 | 3.0 | 3.0 | 3.0 | 3.0 | 3.0 |
| Polydis [PBW$^1$] | 15.0 | 15.0 | 15.0 | 15.0 | 15.0 | 15.0 | 15.0 | 15.0 | 15.0 | 15.0 |
| D-1 [PBW$^1$] | 15.0 | 15.0 | 15.0 | 15.0 | 15.0 | 15.0 | 15.0 | 15.0 | 15.0 | 15.0 |
| Dicy [PBW$^1$] | 4.01 | 4.01 | 4.01 | 4.01 | 4.01 | 4.01 | 4.01 | 4.01 | 4.01 | 4.01 |
| DMH [PBW$^1$] | | 0.34 | | | | | | | | |
| TMH [PBW$^1$] | | | 0.45 | | | | | | | |
| MPBDMH [PBW$^1$] | | | | 0.51 | | | | | | |
| C-1 [PBW$^1$] | | | | | 0.56 | | | | | |
| C-2 [PBW$^1$] | | | | | | 0.75 | | | | |
| C-3 [PBW$^1$] | | | | | | | 1.03 | | | |
| C-4 [PBW$^1$] | | | | | | | | 1.00 | | |
| C-5 [PBW$^1$] | | | | | | | | | 3.16 | |
| C-6 [PBW$^1$] | | | | | | | | | | 1.03 |
| Filler mix [PBW$^1$] | 19.0 | 19.0 | 19.0 | 19.0 | 19.0 | 19.0 | 19.0 | 19.0 | 19.0 | 19.0 |
| TSS$_{180}$ [MPa] | 21.4 | 21.7 | 21.4 | 21.7 | 21.5 | 21.8 | 21.4 | 22.0 | 20.9 | 21.1 |
| TSS$_{165}$ [MPa] | NM$^2$ | NM.$^2$ | NM$^2$ | 20.1 | 21.1 | 21.5 | 20.0 | 21.3 | 19.7 | 19.2 |
| FE [J] | 14.2 | 14.4 | 13.9 | 16.1 | 18.4 | 17.9 | 16.8 | 16.5 | 16.0 | 14.8 |
| $\Delta_{FE}$ [%] | | 1 | −2 | 13 | 30 | 26 | 18 | 16 | 13 | 4 |

TABLE 2-continued

Compositions and results.

|  | Ref.1 | Ref.2 | Ref.3 | Ref.4 | 1 | 2 | 3 | 4 | 5 | 6 |
|---|---|---|---|---|---|---|---|---|---|---|
| Visc (1 d, 25° C.) [mPas] | 395 | 360 | 345 | 350 | 230 | 454 | 471 | 259 | 630 | 408 |
| Visc (1 w, 60° C.) [mPas] | 395 | 455 | 420 | 1340 | 320 | 500 | 596 | 370 | 893 | 541 |
| $\Delta_{visc}$ [%] |  | 26 | 22 | 283 | 39 | 10 | 27 | 43 | 42 | 33 |
| $T_g$ [° C.] | 106 | 103 | 103 | 105 | 99 | 101 | 103 | 99 | 103 | 103 |
| Tonset-DSC [° C.] | 189 | 185 | 188 | 172 | 173 | 180 | 174 | 172 | 168 | 178 |
| Tpeak-DSC [° C.] | 198 | 194 | 197 | 181 | 180 | 187 | 184 | 180 | 178 | 188 |

[1]PBW = parts by weight
[2]NM = not measurable.

The results from Table 2 show that the aliphatic accelerators in Comparison Example Ref.2 and Ref.3 can only minimally reduce the cure temperature of the epoxy resin composition compared with the unaccelerated composition without the accelerator (Ref.1), while in the Examples with the accelerators as specified by formula (I), there is an appreciable reduction (Examples 1 to 6).

Comparison Example Ref.4 shows that aromatic accelerators not corresponding to formula (I) do enable a reduction in cure temperature, but such compositions are not storage-stable. Examples 1 to 6, however, are storage-stable.

Furthermore, it was discovered that addition of accelerators corresponding to formula (I) (Examples 1 to 6), sometimes quite considerably increases the impact strength, while this is not the case for aliphatic accelerators not corresponding to formula (I) (Ref.2 and Ref.3). This is especially pronounced for Examples 1, 2, and 3.

What is claimed is:

1. Heat-curing epoxy resin composition comprising:
   a) at least one epoxy resin A with more than one epoxy group per molecule on the average;
   b) at least one curing agent B for epoxy resins which is activated by elevated temperature;
   c) at least one accelerator C of formula (I)

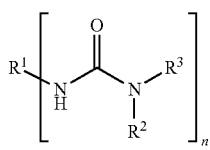

(I)

where:
   $R^1$ stands for an n-valent aliphatic, cycloaliphatic, or araliphatic radical with at least one hetero atom;
   $R^1$ does not contain a biuret, isocyanurate, urethane, uretdione, or diuretdione group;
   $R^2$ and $R^3$ either each independently stand for an alkyl group or an aralkyl group, which optionally is substituted or has a hetero atom; or together stand for a divalent aliphatic radical with 3 to 20 C atoms that is part of an optionally substituted heterocyclic ring with 5 to 8 ring atoms; and
   n stands for a number from 1 to 10; and
   d) optionally at least one toughener D.

2. Heat-curing epoxy resin composition as in claim 1, wherein the at least one hetero atom present in radical $R^1$ is an oxygen atom.

3. Heat-curing epoxy resin composition as in claim 1, wherein $R^2$ and/or $R^3$ stands for an alkyl group with 1 to 10 C atoms.

4. Heat-curing epoxy resin composition as in claim 1, wherein $R^1$ stands for an epoxide with n epoxy groups, in which at least one of the n epoxy groups of formula (IIa) has been replaced by groups of formula (IIb), and the C atom marked with the asterisk * is bonded to a nitrogen of an urea group in the accelerator of formula (I):

5. Heat-curing epoxy resin composition as in claim 1, wherein $R^1$ stands for a radical of formula (III),

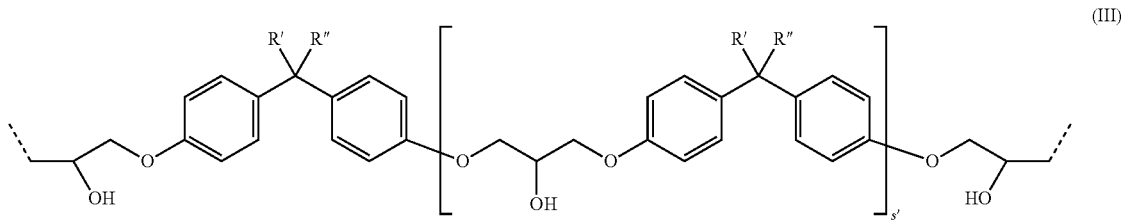

where:

where R' and R" each independently stands either for H or $CH_3$ and the subscript s' stands for a number from 0 to 12.

6. Heat-curing epoxy resin composition as in claim 1, wherein R¹ stands for a radical of an ether group-containing aliphatic polyamine after removal of the amino groups.

7. Heat-curing epoxy resin composition as in claim 1, wherein R¹ stands for a radical of an amino acid or an amino acid ester after removal of the amino group.

8. Heat-curing epoxy resin composition as in claim 1, wherein the toughener D is selected from the group consisting of blocked polyurethane polymers, liquid rubbers, epoxy resin-modified liquid rubbers, and core/shell polymers.

9. Heat-curing epoxy resin composition as in claim 1, wherein the toughener D is a liquid rubber which is an acrylonitrile/butadiene copolymer, which is terminated by carboxyl groups or (meth)acrylate groups or epoxy groups, or is a derivative thereof.

10. Heat-curing epoxy resin composition as in claim 1, wherein the toughener D is a blocked polyurethane polymer of formula (IV):

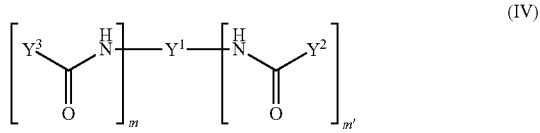

where:
Y¹ stands for a linear or branched polyurethane polymer PU1 terminated by m+m' isocyanate groups, after removal of all terminal isocyanate groups;
Y² stands for a blocking group which is cleaved at a temperature above 100° C.; and
Y³ stands for a group of formula (IV')

wherein R⁴ stands for an aliphatic, cycloaliphatic, aromatic, or araliphatic epoxy radical containing a primary or secondary hydroxyl group, after removal of the hydroxy and epoxy groups;
p=1, 2, or 3; and
m and m' each stands for numbers from 0 to 8, provided that m+m' stands for a number from 1 to 8.

11. Heat-curing epoxy resin composition as in claim 10, wherein Y² stands for a radical selected from the group consisting of

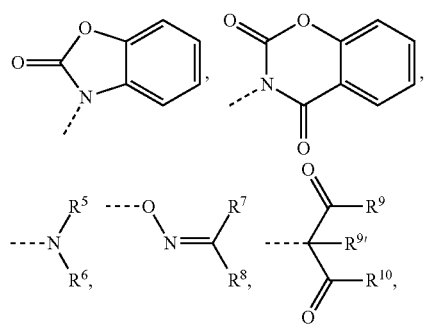

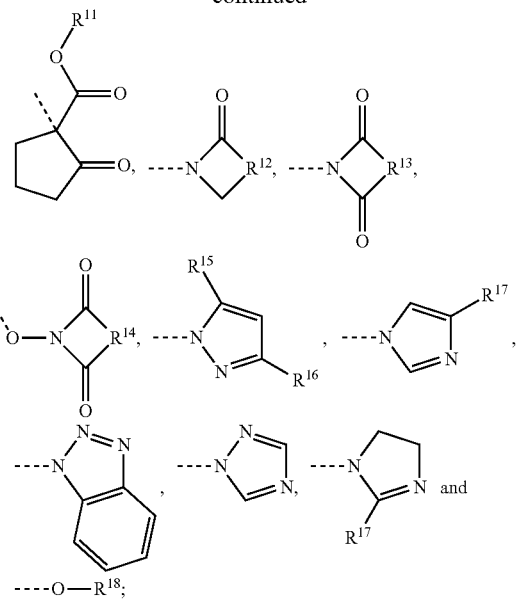

where:
R⁵, R⁶, R⁷, and R⁸ each independently stands for an alkyl or cycloalkyl or aryl or aralkyl or arylalkyl group; or else R⁵ together with R⁶, or R⁷ together with R⁸ forms part of a 4- to 7-membered ring, which is optionally substituted;
R⁹, R⁹', and R¹⁰ each independently stands for an alkyl or aralkyl or aryl or arylalkyl group or for an alkyloxy or aryloxy or aralkyloxy group;
R¹¹ stands for an alkyl group;
R¹², R¹³, and R¹⁴ each independently stands for an alkylene group with 2 to 5 C atoms, which optionally has double bonds or is substituted, or for a phenylene group or for a hydrogenated phenylene group;
R¹⁵, R¹⁶, and R¹⁷ each independently stands for H or for an alkyl group or for an aryl group or for an aralkyl group; and
R¹⁸ stands for an aralkyl group or for a mononuclear or polynuclear substituted or unsubstituted aromatic group, which optionally has aromatic hydroxyl groups.

12. Heat-curing epoxy resin composition as in claim 10, wherein m is different from 0.

13. Heat-curing epoxy resin composition as in claim 1, wherein the epoxy resin composition contains at least one physical or chemical blowing agent.

14. Heat-curing epoxy resin composition as in claim 1, wherein a proportion of epoxy resin A is 10-85 wt. %, based on a weight of the composition.

15. Heat-curing epoxy resin composition as in claim 1, wherein an amount of curing agent B for epoxy resins, which is activated by elevated temperature, is 0.1-30 wt. %, based on a weight of epoxy resin A.

16. Heat-curing epoxy resin composition as in claim 1, wherein an amount of accelerator C is 0.01-6.0 wt. %, based on a weight of epoxy resin A.

17. A one-component heat-curing adhesive comprising the heat curing epoxy resin composition as in claim 1.

18. A method of accelerating curing of a heat-curing epoxy resin composition, comprising adding at least one epoxy resin A with more than one epoxy group per molecule on average and at least one curing agent B for epoxy resins which is activated by elevated temperature to at least one accelerator C of formula (I)

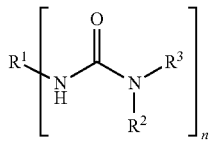

where:
- R¹ stands for an n-valent aliphatic, cycloaliphatic, or araliphatic radical with at least one hetero atom;
- R¹ does not contain a biuret, isocyanurate, urethane, uretdione, or diuretdione group;
- R² and R³ either each independently for an alkyl group or an aralkyl group, which optionally is substituted or has a hetero atom; or together stand for a divalent aliphatic radical with 3 to 20 C atoms that is part of an optionally substituted heterocyclic ring with 5 to 8 ring atoms; and
- n stands for a number from 1 to 10.

19. Method for bonding heat-stable substrates, comprising the steps:
  i) applying a heat-curing epoxy resin composition as in claim 1 to the surface of a heat-stable substrate S1;
  ii) bringing the applied heat-curing epoxy resin composition into contact with the surface of another heat-stable substrate S2; and
  iii) heating the applied heat-curing epoxy resin composition to a temperature of 100° C.-220° C.;
  wherein substrate S2 consists of material which is the same as or different from substrate S1.

20. A method for obtaining a cured epoxy resin composition, comprising heating a heat-curing epoxy resin composition as in claim 1.

* * * * *